United States Patent
McLeod (10) Patent No.: US 7,404,365 B2
(45) Date of Patent: Jul. 29, 2008

(54) APPARATUS FOR APPLICATION OF LIQUIDS OR LIQUID-SOLID DISPERSIONS TO SOIL HAVING A PIVOTABLE JOINT CONNECTOR

(75) Inventor: Robert Archie McLeod, Woodstock (CA)

(73) Assignee: Holland Equipment Limited, Norwich, Ontario (CA)

( * ) Notice: Subject to any disclaimer, the term of this patent is extended or adjusted under 35 U.S.C. 154(b) by 199 days.

(21) Appl. No.: 11/401,356

(22) Filed: Apr. 11, 2006

(65) Prior Publication Data

US 2007/0234941 A1    Oct. 11, 2007

(51) Int. Cl.
*A01C 23/00* (2006.01)

(52) U.S. Cl. ...................... 111/121; 111/127

(58) Field of Classification Search ......... 111/118–129, 111/7.1–7.4, 925
See application file for complete search history.

(56) References Cited

U.S. PATENT DOCUMENTS

2002/0148396 A1* 10/2002 Allan et al. .................. 111/118

* cited by examiner

*Primary Examiner*—Christopher J. Novosad
(74) *Attorney, Agent, or Firm*—Gowling Lafleur Henderso LLP; D. Doak Horne (57) ABSTRACT

An apparatus for application of a liquid manure to soil, possessing a frame which is adapted when towed over soil to apply such to the soil. A supply conduit, having a distal end and a proximal end is provided. The distal end thereof is adapted to be releasibly coupled and in fluid communication with a flexible supply hose which supplies the liquid-solid solution, such as liquid manure, to the distal end of the conduit. The proximal end of the conduit is in fluid communication with a manifold which thereafter via a plurality of supply tubes supplies such liquid/liquid solid dispersion to the soil. An intermediate portion of the supply conduit is flexible. A boom member at its distal end supports a distal end of the supply conduit. A proximal end of the boom member is pivotably coupled to the frame to allow pivotal movement of the distal end of the boom member in at least a horizontal plane. The pivotal coupling in a preferred embodiment further permits limited vertical movement of the distal end of the boom member to better allow direct transmittal of tensile pulling forces on the flexible supply hose to reduce the incidence of kinking of such supply hose.

9 Claims, 8 Drawing Sheets

APPARATUS FOR APPLICATION OF LIQUIDS OR LIQUID-SOLID DISPERSIONS TO SOIL HAVING A PIVOTABLE JOINT CONNECTOR

FIELD OF THE INVENTION

This invention relates to farm equipment, and in particular to an improved apparatus for applying liquids or liquid-solid dispersions, such as liquid manure, to soil.

BACKGROUND OF THE INVENTION AND DESCRIPTION OF THE PRIOR ART

Liquid manure is a valuable source of nutrients for agricultural crops. Other nutrient streams, typically liquid or liquid-solid dispersions, may include effluent from food processing plants, municipal bio-solids from sewage treatment plants, or commercially-available liquid fertilizers.

In the case of prior art implements and methods for applying such liquid-solid dispersions to tracts of land, a dragline system is typically used to provide the liquid-solid slurry to the implement for subsequent delivery to the soil. In this regard, a slurry in the form of a liquid-solid dispersion is pumped from a lagoon or storage tank to the field by a piping system, where it is delivered to an application implement via a flexible dragline. In the field the flexible dragline is coupled to the application implement, and the implement while coupled to the flexible dragline is pulled across the field by a tractor, typically in a serpentine fashion, and the dragline supplies the liquid-solid dispersion to the implement for delivery to the soil.

The implement may spread the slurry in a broadcast manner on the surface of the soil, or more preferably apply the slurry in along the cultivation path of the implement or rows of live crop. Alternatively the implement may blend or bury the slurry in furrows or mix it with the soil during aeration or tillage of the soil.

The tractor, which tows the application implement, due to flexibility of the dragline, can follow a serpentine path in the field to give uniform coverage of the land while being operatively connected to the flexible dragline.

Typically, with respect to prior art devices which are used in this manner and which have capability of being operatively coupled to a flexible dragline, a swing pipe (invariably a horizontal conduit extending rearwardly of the towed implement) is provided on the towed implement which assists when the tractor reverses direction at the end of a field being fertilized. One end of such swing pipe pivotally is connected to the implement; the other connects to the dragline, which is in turn operatively connected to the liquid-solid dispersion distribution system. The swing pipe, by being pivotable, better transmits the forces required to pull the dragline in a tensile manner to the dragline. The function of the swing pipe is further to conduct the slurry to the implement for delivery to the soil, and further to provide clearance with the structure of the implement when the tractor makes turns in the field during its following of a serpentine path in the field.

A number of soil tillage or soil aeration devices of the above type towed by a tractor are currently commercially available. Such devices, in addition to applying liquid-solid dispersions to the soil, may further till or aerated the soil at the same time as a liquid or liquid-solid dispersion, such as liquid fertilizer or liquid manure, is applied to the soil.

Figure 1:
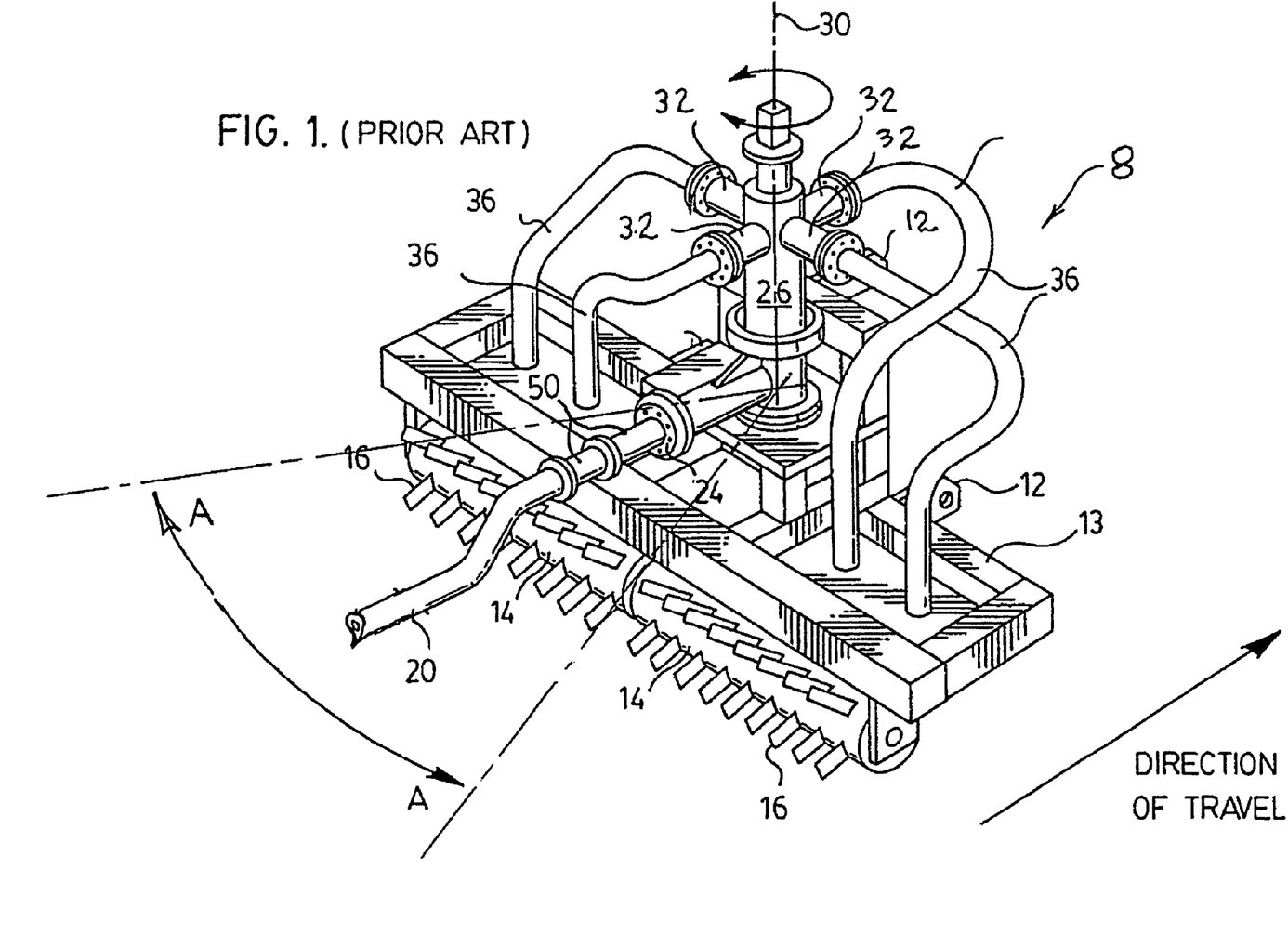
FIG. 1 is a perspective view of a prior art aeration and liquid manure application device which may be towed by and attached to a three-point hitch of a tractor, which utilizes a vertically extending pivotable manifold to which a horizontally extending conduit is attached.

One such prior art apparatus is a soil tillage and liquid manure applicator 8 of the type shown in FIG. 1 hereto. Such apparatus 8 comprises a frame 13 and is adapted to be towed behind a tractor (not shown) by attachment of the 3-point hitch of the tractor to lug members 12 on apparatus 8. Gangs of tined rollers 14 are provided, each provided with protruding tines 16 to penetrate the soil when apparatus 8 is towed over the soil. Flexible supply hose 20 is adapted to be attached, at the rear of apparatus 8, to swing pipe 50 which is in turn coupled in fluid communication with a vertically-extending manifold 26 which is rotatable about vertical axis 30 to allow pivotable movement of swing pipe 50 in the direction shown by arrows "A". A plurality of flexible supply tubes 36 extend from flanges 32 on vertical manifold 26 to various points along the frame 13 of apparatus 8 to allow the liquid manure to be directed to the soil at various points along the front of apparatus 8 in front of the gangs of tined rollers 14.

Disadvantageously, however, with apparatus 8 of the prior art, pivoting of vertical manifold 26 during pivotable movement of swing pipe 8 causes wear and friction in the many flexible supply tubes 36, resulting in necessary and frequent replacement thereof. As typically many individual supply tubes 36 are incorporated in such prior art apparatus 8 shown in FIG. 1 (only four are shown but frequently many more are employed) this is a serious and important drawback to the implementation and continued use of such prior art apparatus 8.

Figure 2:
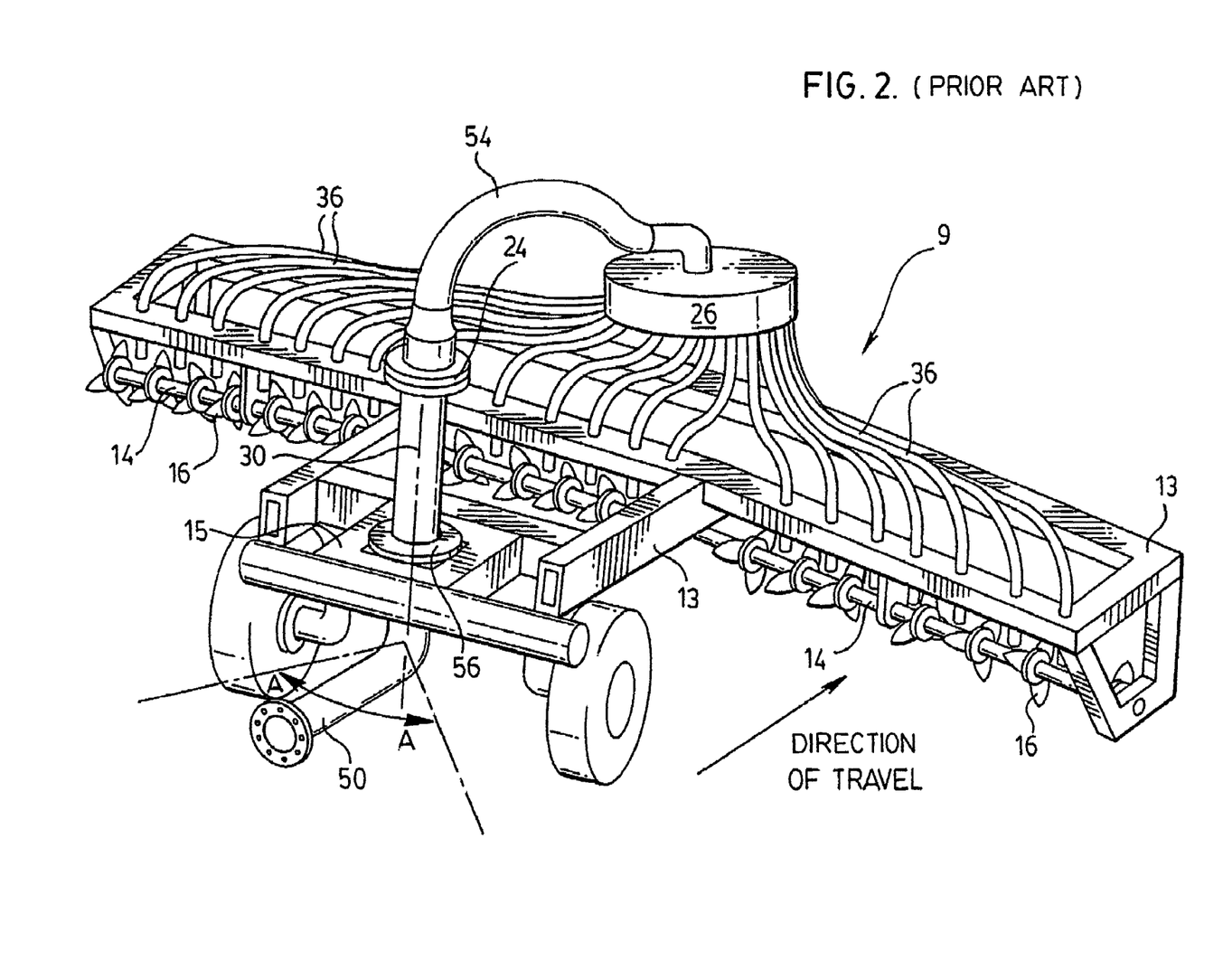
FIG. 2 is a perspective view of another prior art aeration and liquid manure application device which similarly may be towed by a tractor, which utilizes an "L" shaped conduit having a collar, to which a chopper manifold is in fluid communication via a flexible hose.

Another prior art soil aerating and manure applicator apparatus is the prior art apparatus 9 shown in FIG. 2 hereto.

As shown in FIG. 2, prior art apparatus 9 comprises a frame 13 which may be towed by a tractor (not shown) over the ground. A swing pipe 50, having fixed collar 56 thereon, is provided, for attachment to a flexible supply hose (not shown). Swing pipe 50 is corralled and rotatably positioned within frame members 15 of apparatus frame 13, and is thus pivotably rotatable in the direction of arrows "A" about vertical axis 30.

Swing pipe 50 is coupled to and in fluid communication with a flexible conduit member 54 at one end of conduit member 54. The opposite end of flexible conduit member 54 is in fluid communication with manifold 26, which serves to distribute the supply of liquid manure to various points along frame 13 via numerous supply tubes 36 extending therefrom. Such supply tubes 36 further extend in proximity to tines 16 on gangs of tined rollers 14, to allow liquid manure to be mixed in with soil during the passage of the gangs of tined rollers 14 over the soil.

Disadvantageously with the prior art apparatus 9 of FIG. 2, during pivoting of swing pipe 50 it is necessary that flexible conduit 54 twist to permit such pivotable movement of swing pipe 50. This has the undesirable effect that conduit 54 may sometimes kink, depending on the degree of twist and the pressure to which such flexible conduit is subject. In addition, twisting of conduit 54 results in wear to flexible conduit 54 necessitating its replacement from time to time.

Accordingly, a real need exists for an improved apparatus capable of applying liquid-solid dispersions to soil, having a horizontal supply conduit which pivots in at least the horizontal plane, and preferably also in the vertical plane, yet be durable and require little or more simplified maintenance.

SUMMARY OF THE INVENTION

The present invention thus relates to an improved apparatus adapted for providing liquids or liquid solid dispersions, typically a liquid manure dispersion that is supplied to the apparatus via a flexible supply hose, to soil.

One of the major improvements in the apparatus of the present invention relates to providing means of permitting coupling of a conduit on the apparatus to the flexible supply hose which allows pivotable movement of the point of connection to such flexible supply hose, thereby allowing more direct transmittal of tensile pulling forces to the flexible supply hose and thus reducing the incidence of non-axial applied forces to such supply hose which may otherwise cause or contribute to kinking of such supply hose, while at the same time ensuring a reliable and durable fluid connection of the flexible supply hose to the apparatus and ultimate trouble-free supply of the liquid dispersion to the soil.

Accordingly, in a broad aspect thereof, the present invention provides for an apparatus for application of liquid and liquid solid solutions to soil, comprising a boom member which is pivotably coupled to a frame, and which supports and which is secured to a portion of a fluid conduit. A further portion of the fluid conduit is flexible and bendable to allow the boom member to which the fluid conduit is fixedly attached for a portion of its length to pivot about its point of pivotable coupling to the frame. A distal end of the conduit is adapted to be attached to a flexible supply hose, which does not form a part of the invention, which supply hose supplies liquid and liquid-solid dispersions to the apparatus.

As a result of possessing a flexible coupling and a further flexible conduit portion, the apparatus, when connected to the flexible supply hose, may more directly transmit axial pulling force to the flexible supply hose via the boom member, due to the boom member being able to pivot and more direct transfer of axial pulling forces to the flexible supply hose and thereby reduce the tendency of the flexible supply hose to kink and thereby restrict or block the supply of liquid or liquid solid dispersions to the apparatus.

Thus, in a broad aspect of the present invention, the improved apparatus of the present invention for applying a liquid or a liquid-solid dispersion to soil comprises:

frame means;

a manifold;

a plurality of flexible tube members, at one end thereof in fluid communication with said manifold and an other end thereof adapted to permit delivery of said liquid or said liquid-solid dispersion to said soil;

a boom member, having a distal end and a proximal end;

conduit means, at a proximal end thereof in fluid communication with said manifold and at a distal end thereof fixedly coupled to said distal end of said boom member, an intermediate portion of said conduit means being flexible, said conduit means at said distal end further being rigid and adapted to be releasibly coupled to a flexible supply hose; and means for pivotably coupling said boom member at its proximal end to said frame means so as to allow pivotal movement of said distal end of said boom member in at least a horizontal plane;

wherein said distal end of said conduit means is thus permitted to pivot in a horizontal plane by said boom member and by said intermediate flexible portion of said conduit means.

Advantageously, using such configuration there is no necessity that the manifold for distribution of the liquid slurry to the soil be pivotable, nor that the accompanying individual distribution hoses which supply the liquid dispersion to the soil be required to be flexible in either the vertical or horizontal planes Likewise, the problems of the prior art apparatus which required twisting (torsion) of a flexible conduit in order to permit movement of the flexible supply hose when coupled to the apparatus, and the resultant frequent kinking of such flexible conduit due to such torsion, is thereby advantageously avoided with the design of the present invention.

In a preferred embodiment of the apparatus of the present invention the means for pivotably coupling the boom member at its proximal end to the frame means further comprises means to permit pivotable movement of said boom member in a vertical plane. Such means to permit pivotable movement of the boom in the vertical plane may comprise a universal joint to permit pivotable movement in both a vertical plane and in a horizontal plane, or similar joint means permitting a range of pivotal motion of the boom member in both a vertical plane and in a horizontal plane. Such means may alternatively comprise a pair of pivotable joint connections of the boom member to the frame, a first pivotable connection permitting pivotable movement in a vertical plane, and a second pivotable connection permitting pivotable movement in a horizontal plane.

In a further refinement of the apparatus of the present invention, means is further incorporated into the pivotable connection of the boom member to the frame which serves to limit the degree of pivotal movement in the horizontal and/or vertical plane. In a preferred embodiment such means for limiting the degree of pivotable movement comprises a pin member.

In yet a further refinement of the apparatus of the present invention, a hydraulic cylinder may be mounted at one end thereof to the frame means at another end thereof to said boom member, adapted upon actuation to cause pivotable rotation of said boom member in said vertical plane about said means to permit pivotable movement so as to thereby cause said boom member to pivot in said vertical plane and thereby raise said distal end of said boom member.

BRIEF DESCRIPTION OF THE DRAWINGS

Further advantages and permutations will appear from the following detailed description of various non-limiting embodiments of the invention, taken together with the accompanying drawings, in which.

DETAILED DESCRIPTION OF SOME PREFERRED EMBODIMENTS

In all figures, for consistency, identical components are identified with identical reference numerals.

Figure 3:
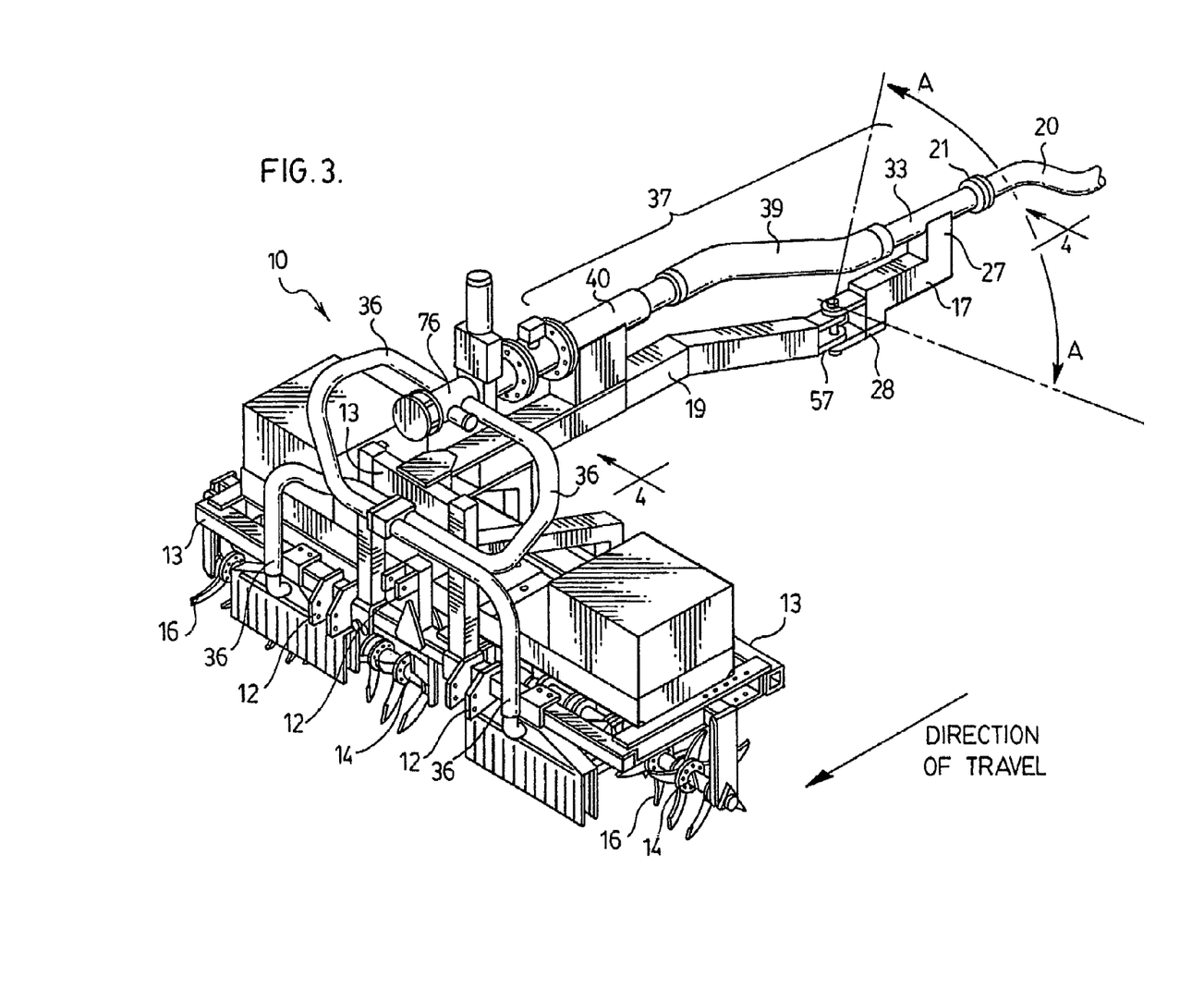
FIG. 3 is an embodiment of an improved apparatus of the present invention for application of liquid-solid dispersions to soil, having a substantially horizontally extending boom member pivotably coupled to the frame of the apparatus.
Figure 4:
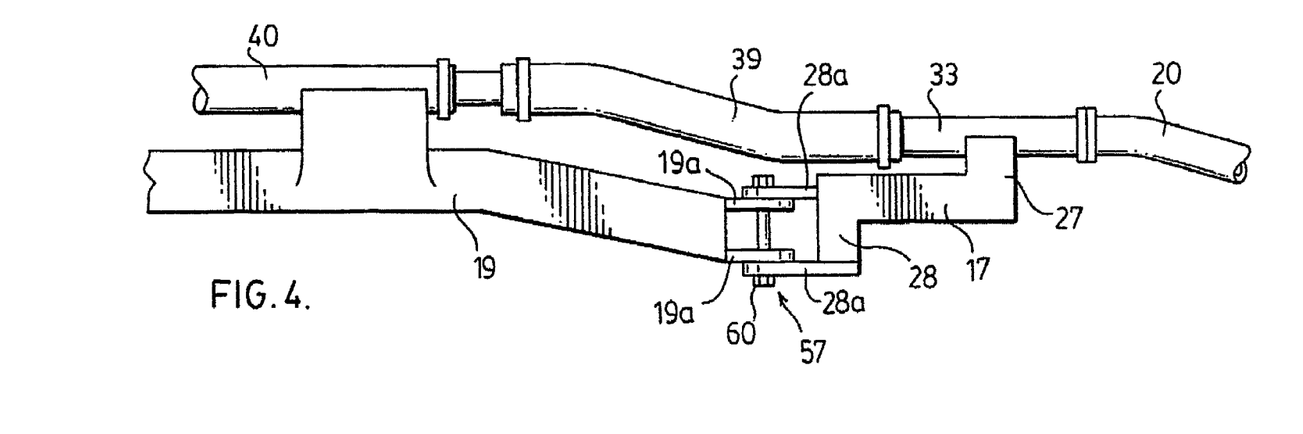
FIG. 4 is a cross-sectional view along plane 44 of FIG. 3.
Figure 5:
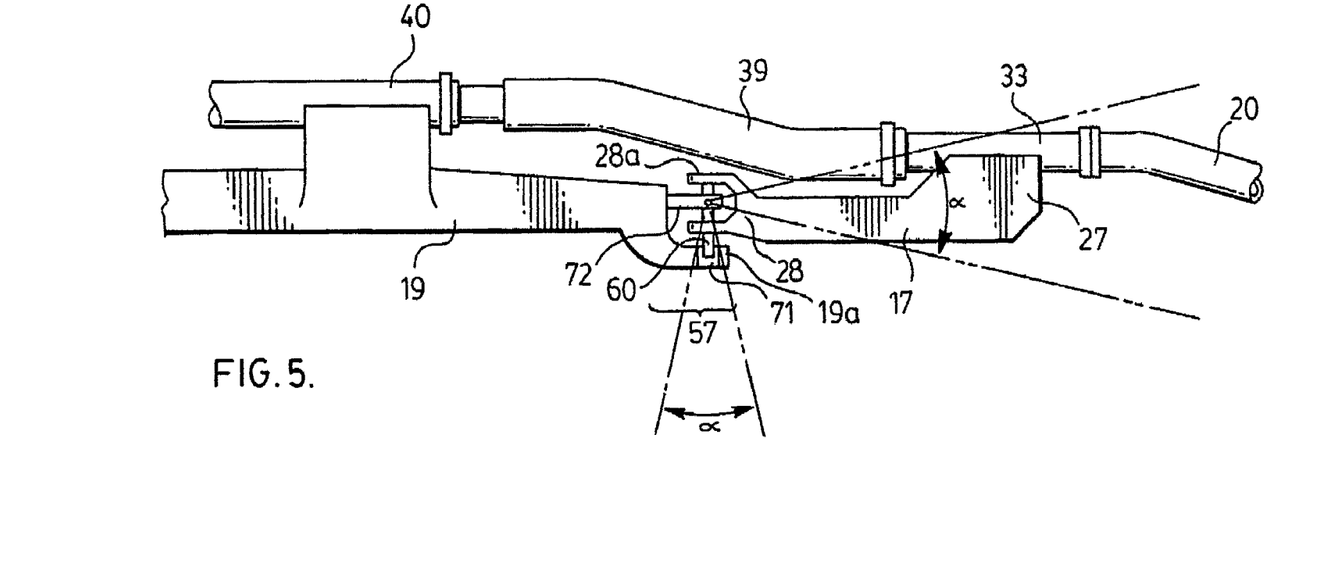
FIG. 5 is a view similar to FIG. 4 showing an alternative arrangement of the pivotable connection.
Figure 6:
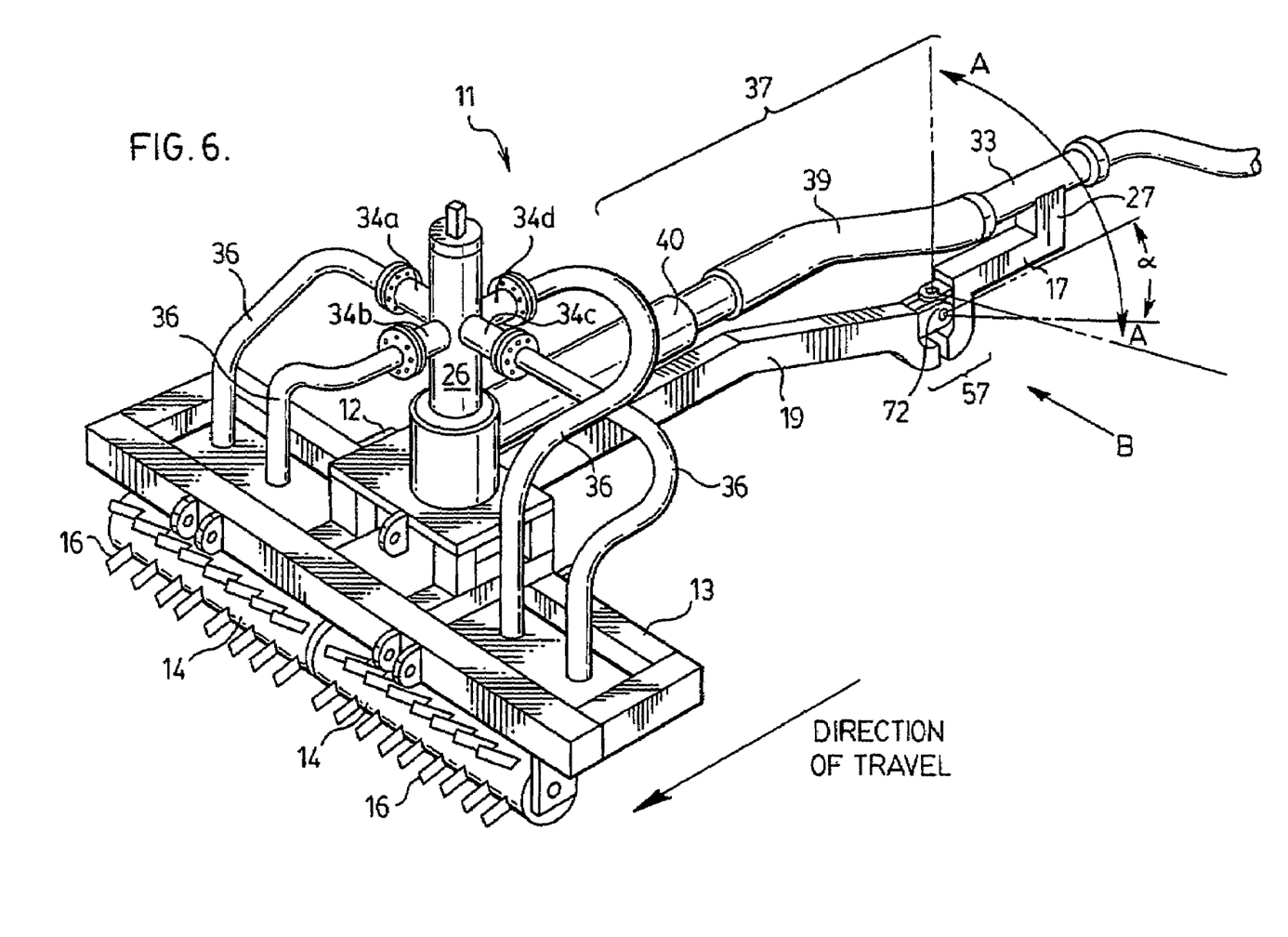
FIG. 6 is a perspective view of a further embodiment of the improved apparatus of the present invention, incorporating a slightly modified pivotable joint connection.

FIG. 3 shows apparatus 10 of the present invention, in one embodiment thereof, for spreading liquid or solid-liquid dispersions to soil, adapted to be towed behind a tractor (not shown) by means of towing or by means of attachment to a 3-point hitch of a tractor via attachment lugs 12.

Apparatus 10 of the present invention comprises a frame 13, adapted to support gangs 14 of tines 16, such tines individually penetrating the soil when apparatus 10 is towed over the soil, for aeration of the soil during application of liquid or liquid-solid dispersions, fertilizers, or slurries to the soil.

Such liquids or liquid-solid dispersions are supplied under pressure to apparatus 10 via a flexible supply hose 20, which is removably fluidly coupled to apparatus 10 via a flange 21 or other commonly-employed fluid coupling, as shown in FIG. 3.

Supported on frame 13 of apparatus 10 is manifold 76, to which are attached a plurality of individual supply tubes 36 which supply liquid solid dispersions from manifold 76 to the soil proximate individual tines 16 on gangs of rollers 14, to thereby ensure the liquid solid dispersions are able to penetrate and be absorbed by the soil.

As seen in FIG. 3, a first end of each supply tube 36 is in fluid communication with manifold 76, and an opposite end situated close to the surface of the soil to permit delivery of liquid or liquid-solid dispersions to the soil.

For reasons more fully elaborated on below, an elongate boom member 17, having a distal end 27 and a proximal end 28, is provided. Boom member 17 is pivotably coupled, at its distal end 28, to an elongate member 19 [which forms part of frame 13 of apparatus 10] by pivotable coupling 57. The manner of pivotable coupling and operation of pivotable coupling 57 is further described, below.

Conduit means 37 is further provided, for conveying liquid or solid-liquid dispersions from flexible supply hose 20 to manifold 76. Conduit means 37 is comprised of an intermediate flexible portion 39, a rigid distal end 33 adapted for releasable coupling to flexible supply hose 20 via flange 21, and a rigid proximal end 40. Proximal end 40 of conduit 37 is adapted for fluid communication with manifold 76, as shown in FIG. 3.

Rigid distal end 33 of conduit means 37 is further rigidly secured to, and adapted to be supported by, distal end 27 of boom member 17.

As best seen from FIG. 4 and FIGS. 10 and 11, pivotable coupling 57 couples distal end 28 of boom member 17 to elongate frame member 19, and comprises a vertical pin member 60 which passes through apertures 61 in each of protruding tabs 28*a* of boom member 17, and protruding tabs 19*a* of elongate frame member 19, so as to pivotably secure elongate frame member 19 to boom member 17. Distal end 27 of boom member 17, with distal end 33 of conduit means 37 rigidly secured thereto, is accordingly permitted to pivot in a horizontal plane.

In the embodiment of the pivotable coupling 57 shown in FIGS. 10 & 11, oversized apertures 61 permits some pivotable movement of boom member 17 in the vertical plane (the plane of the paper in FIG. 10). However, as may be seen from FIGS. 10 and 11, the diameter of pin member 61 relative to the (greater) diameter of apertures 61 in tabs 19*a* and 28*a* serves to limit the amount (ie degree) of angular pivoting of the distal end 27 of boom member 17 in the vertical plane.

Advantageously, with such structural configuration, no tensile loads are applied to flexible intermediate portion 39 of conduit means 37 during pulling of flexible supply hose 20. Rather, all such tensile loads on said flexible supply hose 20 are provided via elongate frame member 19, pivotable coupling 57, and boom member 17.

Also advantageously, although flexible intermediate member 39 due to it being able to bend permits pivotable movement of the distal end 33 of conduit means 37 in a horizontal plane, no twisting or torsion results to intermediate member 39, and thus kinking, blockage, or unacceptable wear of intermediate flexible portion 39 is avoided.

In another variation of the pivotable coupling 57 employed in the present invention, as may be seen from FIG. 5, a universal joint 72 may be employed for pivotable coupling 57. As may also be seen from FIG. 5, in order to limit the degree of pivotal motion of boom member 17 in the vertical plane to a fixed angular rotation "$\alpha$" and thereby avoid flexible supply tube 20 dragging on the ground, in a preferred embodiment a pin member 60 may be incorporated into universal joint 72 and adapted to extend into an oversize aperture 71 in protruding tab 19*a* of elongate arm 19, so as to act as a guide and limit the maximum upward and downward pivotal movement of distal end 27 of boom member 17 in the vertical plane. In a preferred embodiment "$\alpha$" is approximately 5-90° and preferably about 10°.

FIG. 6 shows another apparatus 11 of the present invention, with features identical to FIG. 3 being identified with identical numerals. A vertical manifold 26 is provided in this embodiment, having a plurality of flanged hydrants 34*a-d,* to which flexible supply tubes 36 are fluidly coupled.

As seen in FIG. 6 and in greater detail in FIG. 7, a universal joint 72 is provided for pivotable coupling 57 to allow pivotable coupling of boom member 17 to elongate arm member 19 of frame 13. Notably, unlike the universal joint 72 shown in FIG. 5 having a pin member 60 to limit the angular rotation $\alpha$ of boom member 17, in the embodiment shown in FIG. 6 such means for limiting the amount of angular movement comprises mating surfaces 97 and 98 on lowermost extremities of elongate arm member 19 and boom member 17, respectively, to limit the amount of vertical downward angular rotation $\alpha$ of boom member 17 below the horizontal.

FIG. 8 shows a further modification to the configuration shown in FIG. 7, wherein a hydraulic cylinder 100 is provided, adapted to be supplied with pressurized hydraulic fluid from the towing tractor (not shown) via hydraulic supply line 102.

The purpose of such hydraulic cylinder 100 is two-fold.

Firstly, such hydraulic cylinder 100 serves to raise and lower as desired distal end 33 of conduit means 37 to facilitate connection and de-coupling of supply hose 20. In such manner the operator of the apparatus 11, if a kink is seen to develop or have occurred in the flexible supply hose 20 during for example turning of the apparatus 11 in the field, to raise or lower the distal end of conduit 33 to better or more directly apply tensile loads to supply hose 20 and thereby reduce or avoid the incidence of kinking. Advantageously, such configuration permits the operator of the apparatus 11 and the towing tractor (not shown) to make such adjustments from the cab of the tractor by operation of the tractor hydraulics in the cab of the tractor without having to stop the tractor, disembark from the cab, and physically man-handly the distal end 33 of conduit means 37 to attempt to more directly align the distal end 33 of conduit means 37 with flexible supply hose 20 to thereby avoid kinking of the latter.

Secondly, hydraulic cylinder 100 serves to limit the amount of angular pivoting (ie vertical movement) of distal end 33 of conduit means 37 below the horizontal, thereby preventing distal end 33 (and attached flexible supply hose 20) from becoming substantially vertical and thereby subjugating supply hose 20 (which typically lying on the field and thus horizontal) to a substantially right-angle bend and thus a potential kink in supply hose 20.

Figure 8:
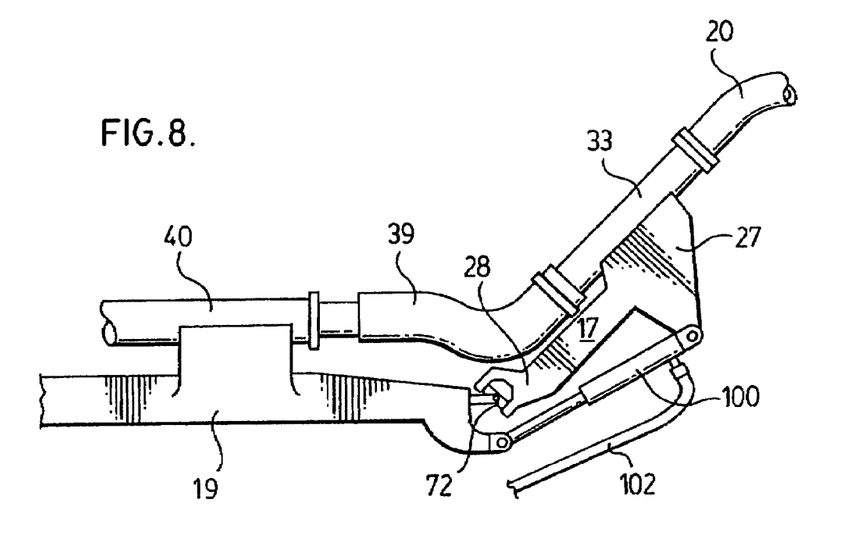
FIG. 8 is a view similar to FIG. 7, showing a further embodiment of the pivotable connection of the present invention.

In the embodiment shown in FIG. 8, hydraulic cylinder 100 is mounted at one end to distal end 19a of elongate arm member 19 (part of frame 13), and at another end mounted to boom member 27. Upon actuation such hydraulic cylinder is adapted to cause pivotable upward rotation of boom member 17 in a vertical plane about pivotable coupling 57 and thereby raise distal end 33 and flexible supply hose 20 when coupled thereto.

Figure 7:
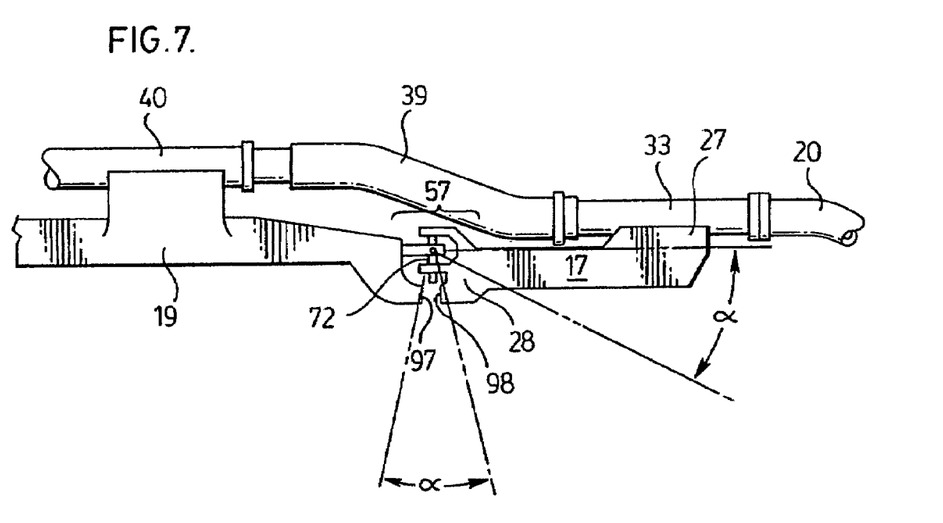
FIG. 7 is a side view in the direction of arrow "B" of FIG. 6.
Figure 9:
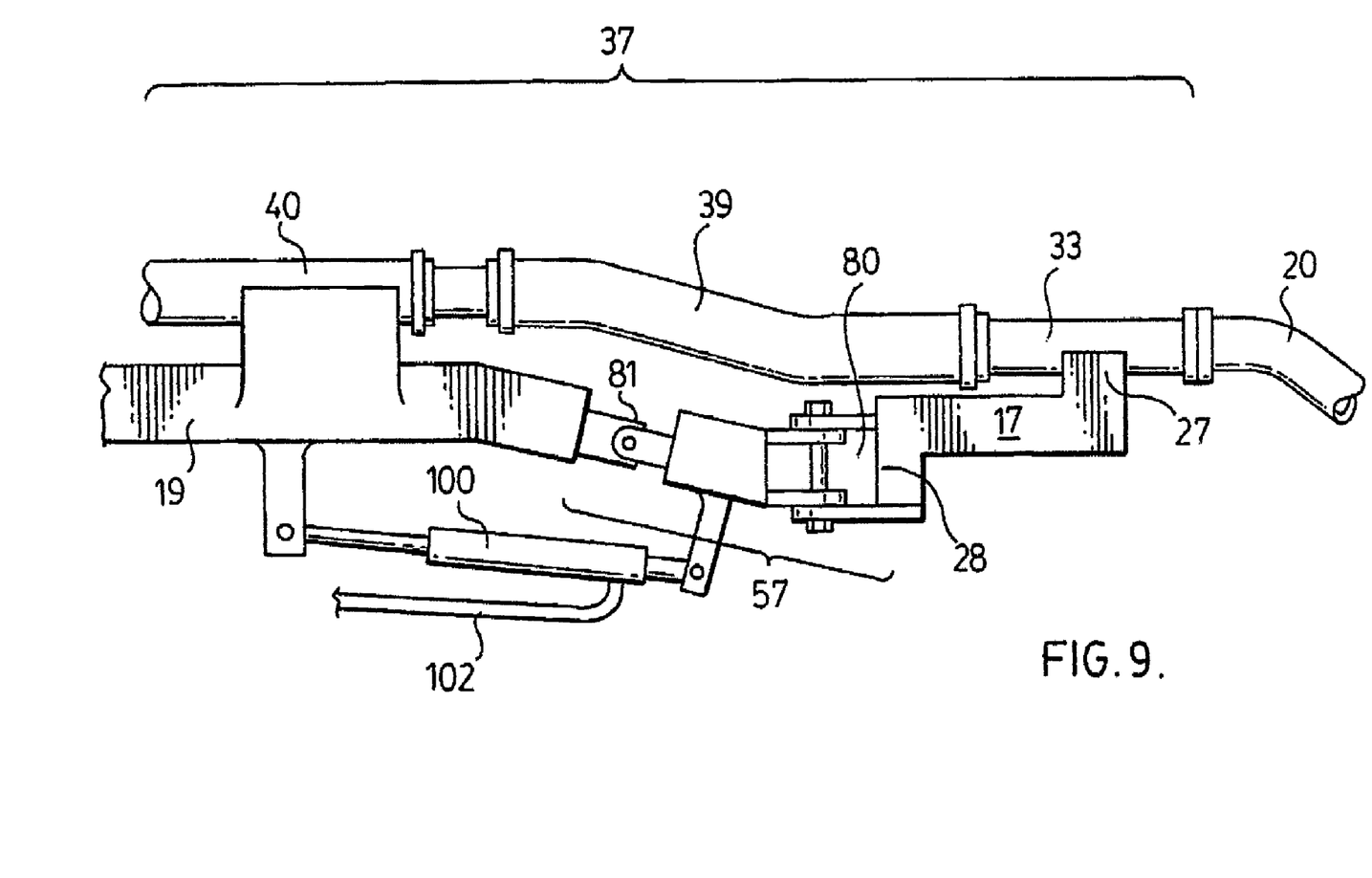
FIG. 9 is a view similar to FIG. 7, showing yet a further embodiment of the pivotable connection of the present invention.
Figure 10:
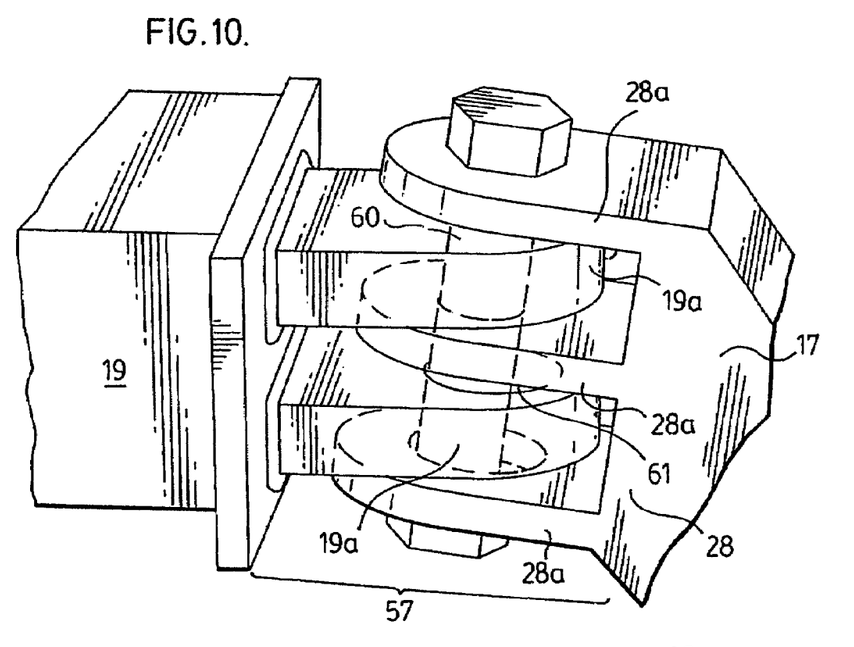
FIG. 10 is a detailed view of the pivotable connection shown in FIG. 5, when said distal end (ie right hand side) of said boom member is angled vertically downward.
Figure 11:
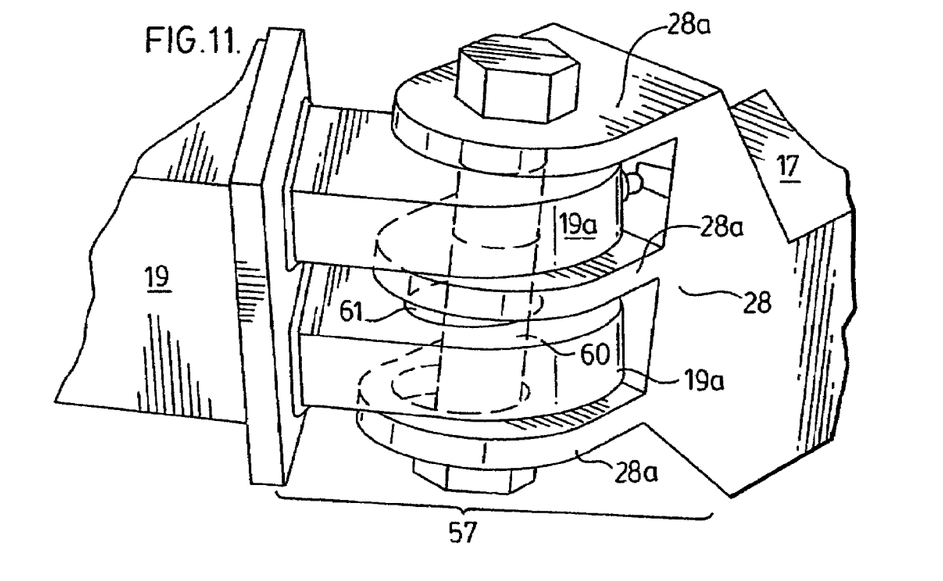
FIG. 11 is a view of the pivotable connection shown in FIG. 10, when the connection is pivoted approximately 750 and the distal end (ie right hand side) of said boom member is angled vertically upward.

FIG. 9 shows a further alternative embodiment of the pivotable coupling 57 of boom member 17 to elongate arm member 19 of frame 13, wherein instead of a single pivotable connection in the form of a single universal joint 72 comprising pivotable coupling 57 as shown in FIGS. 7 & 8, such pivotable coupling 57 comprises a first pivotable connection 80 to permit pivotable movement of boom member 17 in a horizontal plane, and a second pivotable connection 81 to permit pivotable movement of boom member 17 in a vertical plane.

In a preferred embodiment as shown in FIG. 9, a hydraulic cylinder 100 may further be provided, for the purpose inter alia of limiting the extent of downward angular rotation of boom member 17 as described above. Alternatively, pivotable connection 81 may further comprise means for limiting the extent of downward angular movement of boom member 17 by having a lowermost extremity of elongate arm member 19, such as a mating face 97 as utilized in the embodiment of the invention shown in FIG. 7, serve to limit the extent of permitted downward vertical movement of distal end 33 of conduit means 37.

Although the disclosure described and illustrates preferred embodiments of the invention, it is to be understood that the invention is not limited to these particular embodiments. Many variations and modifications will now occur to those skilled in the art. For definition of the invention, reference is to be made to the appended claims.

I claim:

1. An apparatus for applying a liquid or a liquid-solid dispersion to soil, comprising:
   frame means;
   a manifold;
   a plurality of flexible tube members, at one end thereof in fluid communication with said manifold and an other end thereof adapted to permit delivery of said liquid or said liquid-solid dispersion to said soil;
   a boom member, having a distal end and a proximal end;
   conduit means, at a proximal end thereof in fluid communication with said manifold and at a distal end thereof fixedly coupled to said distal end of said boom member, an intermediate portion of said conduit means being flexible, said conduit means at said distal end further being rigid and adapted to be releasibly coupled to a flexible supply hose; and
   means for pivotably coupling said boom member at its proximal end to said frame means so as to allow pivotal movement of said distal end of said boom member in at least a horizontal plane;
   wherein said distal end of said conduit means is thus permitted to pivot in a horizontal plane by said boom member and by said intermediate flexible portion of said conduit means.

2. The apparatus as claimed in claim 1, wherein said means for pivotably coupling said boom member at its proximal end to said frame means further comprises means to permit pivotable movement of said boom member in a vertical plane.

3. The apparatus as claimed in claim 2 wherein said means for pivotable coupling and said means to permit pivotable movement in a vertical plane comprises a universal joint.

4. The apparatus as claimed in claim 2, wherein said means to permit pivotable movement in a vertical plane further comprises means for limiting an amount of angular pivoting of said distal end of said boom member in said vertical plane.

5. The apparatus as claimed in claim 3 or 4 wherein said means for limiting angular pivoting comprises a pin member.

6. The apparatus as claimed in claim 2, 3, or 4 further comprising a hydraulic cylinder mounted at one end thereof to said frame means and at another end thereof to said boom member, adapted upon actuation to cause pivotable rotation of said boom member in said vertical plane about said means to permit pivotable movement so as to thereby cause said boom member to pivot in said vertical plane and thereby raise said distal end of said boom member.

7. An apparatus for applying a liquid or a liquid-solid dispersion to soil, comprising:
   frame means;
   a manifold;
   a plurality of flexible tube members, each at one end thereof in communication with said manifold and an other end thereof adapted to permit delivery of said liquid or said liquid-solid dispersion to said soil;
   a boom member, having a distal end and a proximal end;
   conduit means, at a proximal end thereof in fluid communication with said manifold and at a distal end fixedly coupled to said distal end of said boom member and adapted to be releasibly coupled to a flexible supply hose, an intermediate portion of said conduit means being flexible to permit bending of said intermediate flexible portion of said conduit means; and
   first pivot means for pivotably coupling said boom member at its proximal end to said frame means so as to allow pivotal movement of said boom member in a horizontal plane;
   second pivot means for pivotably coupling said boom member at its proximal end to said frame means so as to allow pivotal movement of said boom member in a vertical plane; and
   wherein said distal end of said boom member is thus permitted to pivot in both said horizontal plane and said vertical plane.

8. The apparatus as claimed in claim 7 further comprising a hydraulic cylinder, mounted at one end thereof to said frame means and at another end thereof to said boom member, adapted upon actuation to cause pivotable rotation of said boom member in said vertical plane about said second pivot means for pivotable coupling so as to thereby cause said boom member to pivot in said vertical plane and thereby raise said distal end of said boom member.

9. An apparatus for applying a liquid or a liquid-solid dispersion to soil, comprising:
   frame means;
   a manifold;
   a plurality of flexible tube members, each at one end thereof in communication with said manifold and an other end thereof adapted to permit delivery of said liquid or said liquid-solid dispersion to said soil;
   a boom member, having a distal end and a proximal end;

conduit means, at a proximal end thereof in fluid communication with said manifold and at a distal end thereof fixedly coupled to said distal end of said boom member, an intermediate portion of said conduit means being flexible, said conduit means at said distal end further being rigid and adapted to be releasibly coupled to a flexible supply hose; and means for pivotably coupling said boom member at its proximal end to said frame means so as to allow pivotal movement of said distal end of said boom member in both a horizontal plane and a vertical plane;

wherein said distal end of said conduit means is permitted to pivot in both a horizontal plane and a vertical plane relative to said frame by said boom member and by said intermediate flexible portion of said conduit means.

\* \* \* \* \*